UNITED STATES PATENT OFFICE.

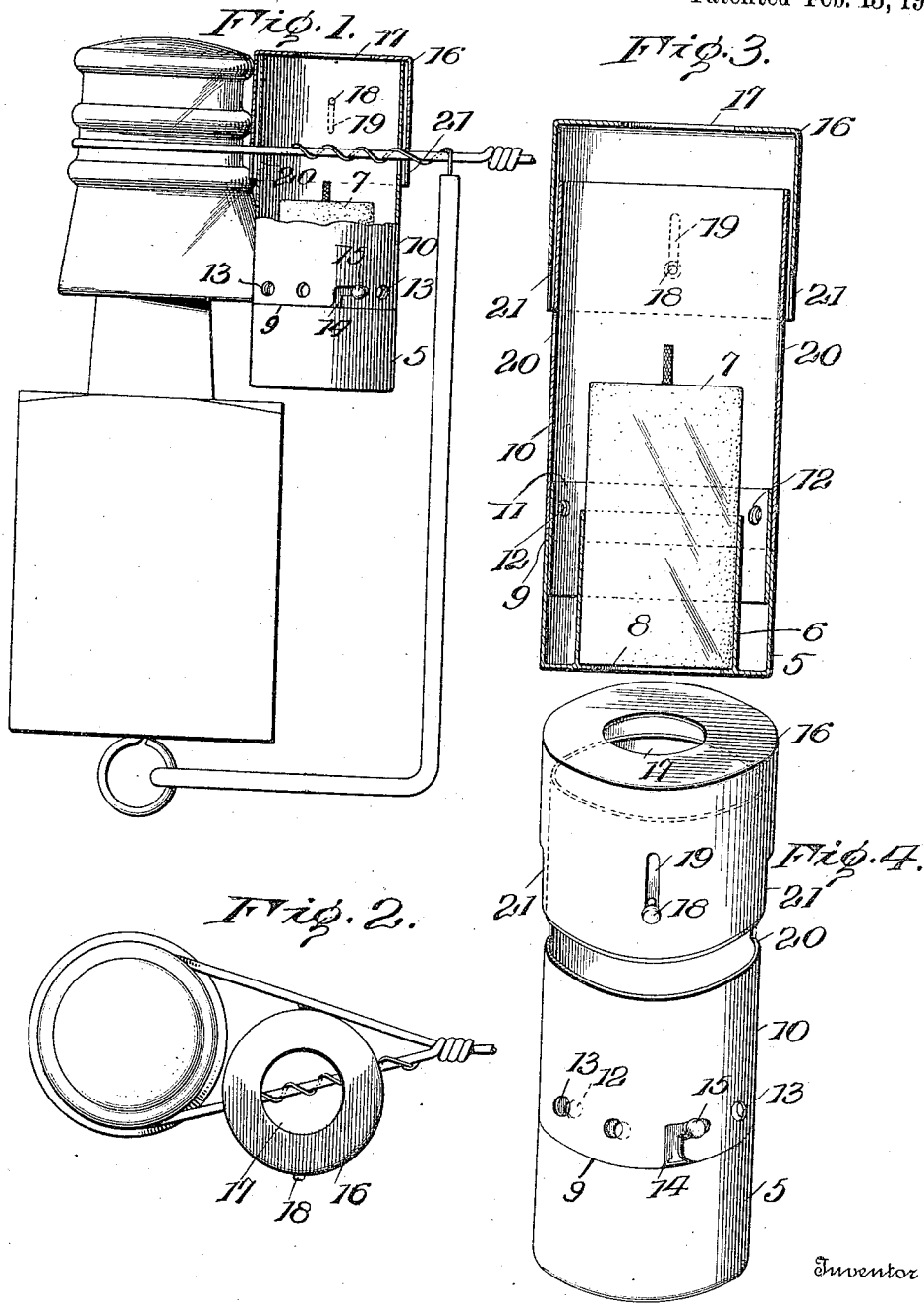

JOHN N. HAVEN, OF WALLA WALLA, WASHINGTON.

SOLDERING APPLIANCE.

1,215,802.

Specification of Letters Patent. Patented Feb. 13, 1917.

Application filed July 5, 1916. Serial No. 107,698.

*To all whom it may concern:*

Be it known that I, JOHN N. HAVEN, a citizen of the United States, residing at Walla Walla, in the county of Walla Walla and State of Washington, have invented certain new and useful Improvements in Soldering Appliances, of which the following is a specification.

This invention relates to lamps or torches used by linemen for soldering wire joints, although the device is not limited to such use, but is adapted to be used for other soldering work, and also for lighting up dark places.

The invention has for its object to provide a very simple and highly efficient device of the kind stated, which concentrates the heat of the flame on the work, and which is so constructed that it is supported from the wire or other part to be operated on.

A further object of the invention is to provide a novel and improved means for protecting the flame from drafts, so that the flame is not liable to be blown out.

With the objects stated in view, the invention consists in a combination and arrangement of parts to be hereinafter described and claimed and in order that the same may be better understood, reference is had to the accompanying drawing forming a part of this specification.

In the drawing,

Figure 1 is an elevation of the device, partly in section, and in position for use, Fig. 2 is a plan view thereof;

Fig. 3 is a central vertical section of the device, and,

Fig. 4 is a perspective view of the same.

Referring specifically to the drawing, 5 denotes the tubular body or base of a lamp or torch, the same being in the form of a cylinder which is open at the top and closed at the bottom. The cylinder contains a holder 6 for a candle 7; or some other heat-holder or burner appliance may be provided. In the bottom of the cylinder is a hole 8 which opens into the part 6 so that the candle may be pushed up to the proper height. Near the top of the cylinder is an external encircling shoulder 9 on which seats the lower end of a tubular shield or sleeve 10 which slidably fits around the cylinder above the shoulder and rises therefrom to shield the flame from the wind, and to concentrate the heat. The shoulder 9 may be formed integral with the cylinder 5; or a ferrule 11 may be inserted into the upper end thereof and fixed thereto, the ferrule forming a top continuation of the cylinder.

In that portion of the sleeve 10 which fits the ferrule or extension 11 of the cylinder 5 are draft openings 13, and the cylinder has openings 12 for the same purpose. The draft may be regulated by turning the sleeve so that its openings 13 register more or less with the openings 12. In the bottom edge of the sleeve 10 is a bayonet slot 14 through which extends a headed stud 15 carried by the side of the part 11, whereby the sleeve 10 is detachably connected to the cylinder 5. The upper horizontal portion of the slot permits the sleeve to be rotated to regulate the draft as hereinbefore described.

The sleeve 10 projects a suitable distance from the top of the part 11 and is closed by a cap 16 fitting over its top, the top of the cap having an opening 17 for the insertion of the solder stick. Endwise separation of the cap and the sleeve is prevented by diametrically opposite, headed studs 18 on the latter which extend through vertical slots 19 in the former, the slots being provided in order that the cap may be slid up and down on the sleeve for a purpose to be presently described.

The sleeve 10 has a horizontal or transverse side slot 20 extending slightly more than half way around the same, and in the cap 16 are two diametrically opposite slots 21 extending vertically and opening through the bottom edge of the cap.

In use, the device is hung on the wire or other part to be soldered by raising the cap 16 a sufficient distance to uncover the slot 20, as shown in Figs. 3 and 4. The device is now positioned so that the part to be soldered lies in the slot 20 and extends across the inside of the sleeve 10, after which the cap is slid down so that its slots 21 seat over the two ends of the wire or other parts which project from opposite sides of the sleeve. The slot 20 is now completely covered by the cap, except where the wire ends project, thereby excluding all draft or wind from the inside of the device. The device is held suspended on the wire or other part, by the latter engaging the top edge of the slot 20 as shown in Fig. 1, so that the hands of the operator are left free for the soldering operation, and upon slipping the cap upward clear of the wire, the device is released and may be slipped off the same sidewise. The device may be conveniently placed in working position by holding the cap, which permits the body to drop down to uncover the slot 20, and after the wire or other part is positioned in the slot, the cap is released, whereupon it drops down to cover the slot as already described, the ends thereof being lapped by the slots 21. The studs 18 working in the slots 19 guide the cap and prevent it from slipping around on the sleeve 10, and the slots 21 are therefore at all times in position to properly register with or lap the ends of the slot 20. The solder stick is inserted through the hole 17.

The device is small and compact in form, and it can be used in close places in telephone and other work, as shown in Fig. 1, it being here shown supported close to an insulator. The device may also be used as a lamp for lighting up dark places if desired.

I claim:

1. A soldering appliance, comprising a base, a burner carried by the base, a tubular shield carried by the base and surrounding the burner, said shield having a transverse side slot above the burner, and a cap slidably mounted over the top of the shield, and having bottom edge slots extending vertically in alinement with the ends of the aforesaid side slot, and adapted to lap said ends.

2. A soldering appliance, comprising a base, a burner carried by the base, a tubular shield carried by the base and surrounding the burner, said shield having a transverse side slot above the burner, a cap slidably mounted over the top of the shield, and having bottom edge slots extending vertically in alinement with the ends of the aforesaid side slot, and adapted to lap said ends, and guiding means for the cap.

3. A soldering appliance, comprising a base, a burner carried by the base, a tubular shield carried by the base and surrounding the burner, said shield having a transverse side slot above the burner, and a cap slidably mounted over the top of the shield, and having bottom edge slots extending vertically in alinement with the ends of the aforesaid side slot, and adapted to lap said ends, the cap also having vertical guide slots, and the shield having side studs extending into said guide slots.

4. A soldering appliance, comprising a base, a burner carried by the base, a tubular shield carried by the base and surrounding the burner, said shield having a transverse side slot above the burner, and a cap slidably mounted over the top of the shield, and having bottom edge slots extending vertically in alinement with the ends of the aforesaid side slot, and adapted to lap said ends, the top of the cap having an aperture.

5. A soldering appliance comprising a tubular base open at the top and closed at the bottom, said bottom having an aperture, a tubular holder for a heating medium mounted on said bottom over the opening, a tubular shield carried by the base and rising therefrom, said shield having a work-receiving aperture, and a cap closing the top of the shield and having an aperture.

6. A soldering appliance comprising a tubular base having side draft apertures, a shield rotatably mounted on the base and rising therefrom, said shield having side draft apertures adapted to register with the draft apertures of the base, and also provided with a work-receiving aperture, and a cap closing the top of the shield and having an aperture, and a holder for a heating medium carried by the base.

In testimony whereof I affix my signature in the presence of two witnesses.

JOHN N. HAVEN.

Witnesses:
J. G. THOMAS,
E. E. SAUZE.

Copies of this patent may be obtained for five cents each, by addressing the "Commissioner of Patents, Washington, D. C."